Oct. 6, 1925. 1,555,814
D. ASPINALL
OIL SALVAGING MEANS
Filed March 11, 1924
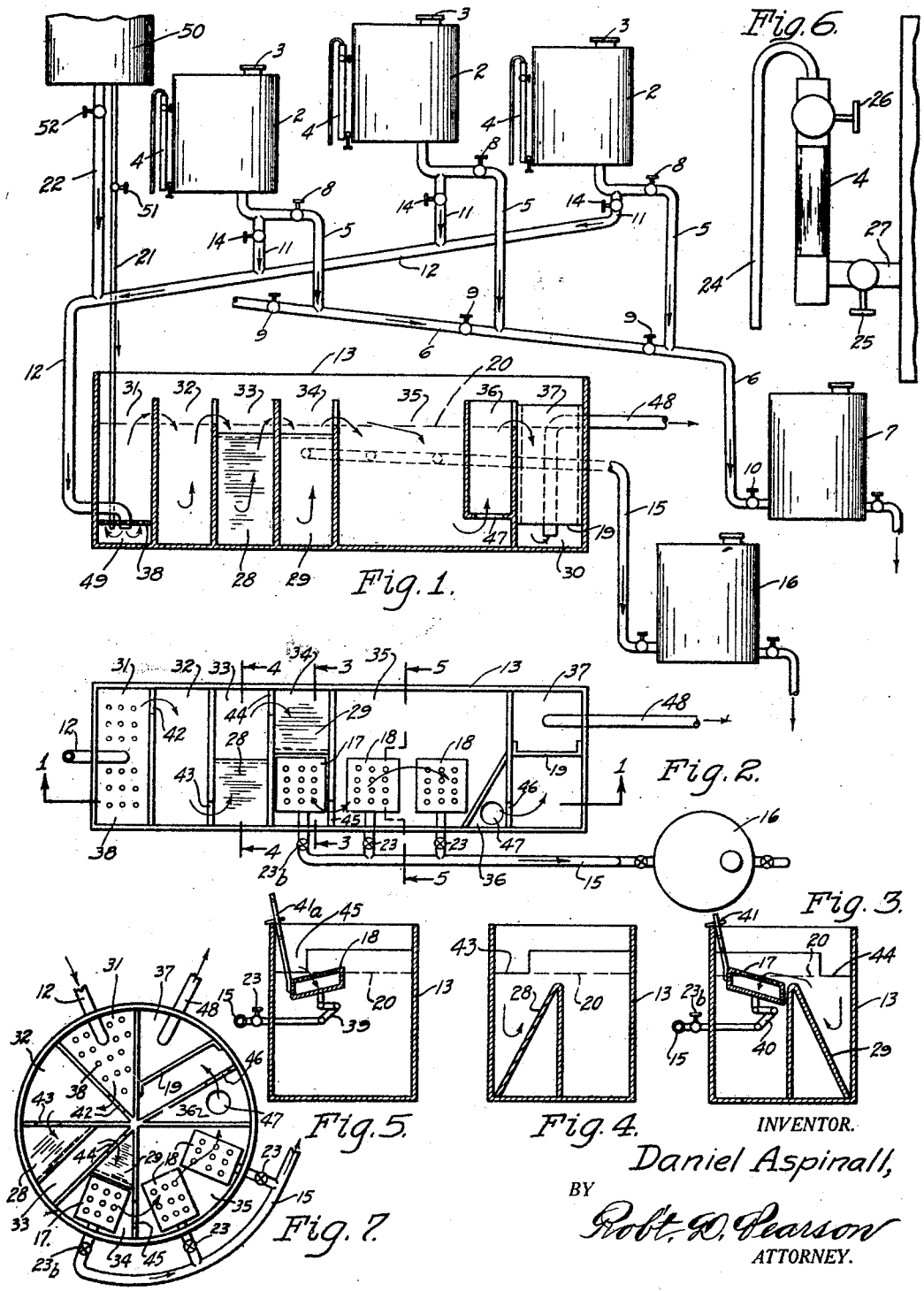
INVENTOR.
Daniel Aspinall,
BY Robt. D. Pearson
ATTORNEY.

Patented Oct. 6, 1925.

1,555,814

UNITED STATES PATENT OFFICE.

DANIEL ASPINALL, OF LOS ANGELES, CALIFORNIA, ASSIGNOR OF ONE-TENTH TO ROBERT D. PEARSON AND TWO-THIRDS TO JESSIE LINSON, BOTH OF LOS ANGELES, CALIFORNIA.

OIL-SALVAGING MEANS.

Application filed March 11, 1924. Serial No. 698,574.

*To all whom it may concern:*

Be it known that I, DANIEL ASPINALL, a citizen of the Dominion of Canada, residing at Los Angeles, in the county of Los Angeles and State of California, have invented certain new and useful Improvements in Oil-Salvaging Means, of which the following is a specification.

This invention relates to a provision for salvaging the oil from a burning tank or tanks in an oil refinery or the like, instead of, as at present, allowing the oil to burn itself out while keeping the tank cool with water thrown on it to prevent explosion.

As at present constituted, these tanks may be connected together through the pipes by which oil is delivered for transportation, but although such delivery pipes are there, there is no provision for salvaging the contents of the burning tank through them when such may require to be done.

The invention, therefore, comprises the provision of a supplementary or salvage tank or tanks located at such a lower level from the oil storage tanks in regular use, that the oil will flow by gravity into the salvage tank when required, and provision is made for connecting any one or any number of the storage tanks to this supplementary or salvage tank.

Provision is also made for withdrawing the final residue of the burning oil from a tank on fire, which it would be dangerous to deliver into the salvage tank and for delivering it through a cooling tank where the hot or burning oil is immediately cooled by passing it through flowing water, and floating on the surface of the water overflows into a second supplementary tank for such repurification as it may require, as oil which has been in immediate contact with the flame and heat of the fire is discolored and unfit for sale until it is again purified.

The invention is particularly described in the following specification, reference being made to the drawings by which it is accompanied, in which:

Figure 1 is a more or less diagrammatic elevation showing a series of the oil storage tanks of a refinery with the emergency storage tank and the several connections which are the particular object of this application.

Figure 2 represents a part plan view of Figure 1.

Figure 3 represents a sectional view on line 3—3 of Figure 2.

Figure 4 represents a sectional view on line 4—4 of Figure 2.

Figure 5 represents a sectional view on line 5—5 of Figure 2.

Figure 6 represents an enlarged elevational view of the gage glasses on the storage tanks in Figure 1.

Figure 7 represents a modified plan view of Figure 2.

In this drawing 2 represents a series of ordinary cylindrical tanks, such as are usually provided for oil storage in a refining plant, these tanks 2 being provided with manholes 3 for ventilation, and the gauge glasses 4 are secured to the outer sides of the said tanks 2 by which the level of the oil in the tanks may be ascertained, and the vent pipe 24 is secured in connection with the upper portion of the said gage glasses 4, the valves 25 and 26 being positioned in connection with the lower and upper ends of the gage glasses 4, respectively, and a connection 27 in turn connects the lower end of the gage glasses 4 and valves 25 to the sides of the said tanks 2, as shown in Figure 6.

Supplementary to such pipe connections as may be necessary for connecting these tanks for delivery for sale, the bottom of each tank 2 is connected by a pipe 5 to a pipe 6 which may be common to all, and delivers into a supplementary or salvage tank 7, this tank 7 being located at a lower level that the oil may flow into it from any of the tanks 2 and is sufficiently remote from them to preclude communication of fire to the tank 7 from any of the tanks 2.

In each pipe 5, adjacent the tank to which it is connected, is a stop valve 8 and between each connection of pipes 5 to the pipe 6 is a stop valve 9, and a valve 10 is also provided in the pipe 6 adjacent the connection of the pipe to the salvage tank 7.

From the branch connection pipe 5 of each tank 2 between that tank and the valve 8 which controls passage through the pipe 5, a second supplementary pipe 11 connects each tank 2 to a pipe 12 delivering by gravity into a quenching or cooling tank 13, below the level of the water line 20 maintained in it, and a stop valve 14 is provided in each pipe 11 adjacent the connection of it to the pipe 5.

From the upper part of the quenching tank 13 an overflow pipe 15 delivers into a second salvage tank 16 for the discolored and residue oil. The said tank 13 is divided into a number of compartments 31 to 37 respectively, the lower portion of the compartment 31 being provided with a breaker plate 38 to form a chamber 49 beneath the said plate 38, and the said pipe 12 leads into the chamber 49 by passing through the outer wall of the tank 13, the gates 42 to 46 are positioned in the walls positioned between the respective chambers 31—32, 32—33, 33—34, 34—35 and 36—37, to allow oil or water to pass therethrough. The elevators 28 and 29 are positioned in the compartments 33 and 34 respectively, with the bevel portions thereof leading upwardly in the direction of the flow of the oil and water, and the skimmer 17 is adjustably positioned behind the said elevator 29 on the universal joint 40, the universal joint 40 being connected to the said pipe 15 with the valve $23^b$ therebetween, and the skimmers 18 are in turn adjustably positioned in the compartment 35 on the universal joint 39, the universal joint 39 being connected to the said pipe 15 with the valves 23 therebetween, and the adjustable hangers 41 and $41^a$ hold the said skimmers 17 and 18, respectively, in an elevated position to suit the oil and water level 20. The passage 47 is formed in the bottom end portion of the said compartment 36 as shown in Figure 1, and the passage 30 is in turn formed in the compartment 37 beneath the plate 19, the plate 19 being secured vertically in the center portion of the compartment 37, and the overflow pipe 48 leads from the bottom portion of the said compartment 37, beyond the passage 30 in the direction of the water flow, to a water disposal means not shown. The water pipe 21 is connected between a water supply tank 50 and the said chamber 49, and the water pipe 22 is in turn connected between the water supply tank 50 and the pipe 12 as shown in Figure 1.

In use assuming the oil in any of the tanks 2 to be on fire or to be threatened by fire the valve 8 of that tank is opened, as also is the valve 10 at the delivery into the salvaging tank 7, while the valve 9 behind the connection 5 of the particular tank 2 on fire is closed. The oil of the fired or threatened tank thus flows out from it through the pipes 5 and 6 into the salvage tank 7 which is sufficiently remote to be safe from communication of the fire to it. When the level of the oil in the tank 2 which is on fire and which is being emptied into the salvage tank 7, nears the bottom of the tank, the valve 8 is closed and the valve 14 is opened, that the residue of the oil in the tank 2, which has been adjacent the burning surface, and which is highly heated and discolored and is more or less charged with impurities, is delivered through the pipes 11 and 12 into the cooling tank 13, and being delivered below the level of the water 20, is coursed through the compartments 31 to 37 in regular sequence, and is thus cooled as it rises through the water and overflows through the pipe 15 into the second salvage tank 16, which salvaged oil may be retreated for purification. The impure oil is thus not delivered into the main salvage tank 7 to render it impure, and obviously if the oil is not burning in the tank 2 from which the oil is withdrawn, the whole of it may be salvaged into the said tank 7.

It will also be noted that the water tank 50 supplies a continuous flow of water through the pipe 22, with the valve 52 open, to the pipe 12, to extinguish the fire in the oil when passing between that point in the said pipe 12 and the chamber 49, and that the water tank 50 also supplies a continuous flow of water through the pipe 21 with the valve 51 open, direct to the said chamber 49 to cool the hot water, oil and steam flowing out of said pipe 12 within the chamber 49, the cooled water and oil within the said chamber 49 is thence forced through the breaker plate 38 in smaller streams or jets, into the body of water within the compartment 31 and is then finally cooled in the compartment 32 by passing through the gate 42, the cooled oil and water is then admitted through the gate 43 into the compartment 33, the said oil and water is now coursed upwardly over the elevator 28 to again fall into the remaining portion of the said chamber 33 and allowed to pass through the gate 44 into the chamber 34. and as the said water and oil flowing into the chamber 34 is again elevated over the elevator 29, the said flow being sufficiently slow to allow the oil to separate from the water and to float thereon, and then the separated oil floating on the top surface of the water is partially skimmed off and allowed to flow by gravity through the open valve $23^b$ into the said pipe 15 and tank 16. All the unseparated and unskimmed oil still remaining in the water is now further coursed through the gate 45 from the said compartment 34 to a substantially larger compartment 35, and the water is now allowed to settle below the remaining oil and to course through the passage 47 beneath the compartment 36, and thence rise up and over the gate 46 into one side of the compartment 37, and thence down on one side of the plate 19 and thereunder through the passage 30 to the other side of the plate 19 and into the opposite side of the same compartment 37, and is thence discharged through the overflow pipe 48.

All the oil is thus permitted to stand sufficiently long in time in the compartment 35, by having a larger area over the slow flowing water thereunder to collect a sufficient amount of oil on the said water, to submerge the said skimmers 18 in the said oil, and thus drain the oil through the skimmers 18 and the open valves 23 into the same pipe 15 hereinbefore described. The said skimmers 17 and 18 being adjusted and held in their proper submersion in the said oil to be above the water level at the strainers thereof, by being adjustably suspended on the joints 40 and 39, by the hangers 41 and 41$^a$ respectively.

The gage glasses 4 facilitate a positive knowledge of the fire and oil conditions and elevations within the said tanks 2, by opening the valves 25 and 26, to ascertain the proper time to manipulate the said valves 8 and 14, and the vent pipes 24 in turn furnish a safety means for the steam, oil or gas to escape and also to prevent fire playing over or around the said tanks 2 from striking the open ends of the said pipes 24, as the case may be.

A means is thus provided at a relatively small cost by which a valuable amount of oil may be salvaged during a fire, and not only so, but the risk of the fire spreading to the other tanks is very considerably lessened.

Obviously the volume of the tank 7 need not be limited to the capacity of one tank, or more than one salvage tank may be provided.

Having thus described my invention what I claim is:

1. A means for salvaging oil or the like from any one of a series of storage tanks when the same is threatened by fire, said means comprising a salvaging tank remote from the storage tank, a quenching tank remote from the storage tank, a second salvaging tank adjacent the quenching tank, means for delivering the contents of any one of the storage tanks through running water into the first named salvaging tank, means for controlling such delivery into the first salvaging tank for delivering the residual contents of any of the storage tanks into the quenching tank, means for discharging the overflow oil from the quenching tank, and means for delivering the residue oil of the quenching tank into the second salvage tank.

2. A means for salvaging oil or the like from any one of a series of storage tanks when the same is threatened by fire, a quenching tank remote from the said storage tanks, means for delivering the contents of any one of the storage tanks into the said quenching tank, means for controlling such delivery into the said quenching tank, means for delivering running water into the said quenching tank and salvaged oil, and a means for delivering the overflow oil and water from the quenching tank into their respective container and overflow means.

3. A means for salvaging oil or the like from any one of a series of oil storage tanks when the same is threatened by fire, a quenching tank remote from the said storage tanks, a plurality of compartments in the said quenching tank adapted to retain a quantity of water therein to predetermined levels, means for delivering the contents of any one of the said oil storage tanks into the first compartment of the quenching tank, means for delivering running water into the oil delivery means from the said storage tanks, an oil and water breaker and coursing means in the said compartments, an oil and water separator means in the said compartments, and a means for delivering the overflow of oil and water from the said compartments into their respective containers.

4. A means for salvaging oil or the like from any one of a series of storage tanks when the same is threatened by fire, said means comprising a salvaging tank remote from the storage tank, a quenching tank remote from the said storage tanks, a plurality of compartments in the said quenching tank for retaining predetermined quantities of water therein, means for delivering the contents of any one of the said storage tanks into the first compartment of the quenching tank, means for delivering running water into the oil delivery means from the said storage tanks, means for delivering running water into the said quenching tank, an oil and water breaker and coursing means in the said compartments, an oil and water separator means in the said compartments, oil skimmers in the said compartments, means for discharging the overflow of water from the last of the said compartments, and a means for delivering the oil from the said skimmers into a second salvaging tank.

5. A means for salvaging oil or the like from any one of a series of storage tanks when the same is threatened by fire, said means comprising a salvaging tank remote from the storage tank, a quenching tank remote from the said storage tanks, a plurality of compartments in the said quenching tank for retaining predetermined quantities of water therein, means for delivering the contents of any one of the said storage tanks into the first compartment of the quenching tank, means for delivering running water into the oil delivery means from the said storage tanks, means for delivering running water into the said quenching tank, an oil and water breaker and coursing means in the said compartments, an oil and water separator means in the said compartments, oil skimmers in the said compartments, means for discharging the overflow of water from the said compartments, a second salvaging tank, a means for delivering the oil from the said skimmers into the second salvaging tank, a means for determining the fire and oil conditions and elevations within the said tanks, and a fire safety means in the said fire and oil determining means, as set forth.

In testimony whereof I affix my signature.

DANIEL ASPINALL.